United States Patent
Arita et al.

[11] Patent Number: 5,976,714
[45] Date of Patent: *Nov. 2, 1999

[54] MAGNETIC RECORDING MEDIUM AND METHOD OF PRODUCING THE SAME

[75] Inventors: Yoji Arita; Mitsunori Mochida, both of Kanagawa, Japan

[73] Assignee: Mitsubishi Chemical Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/734,848

[22] Filed: Oct. 23, 1996

[30] Foreign Application Priority Data

Oct. 23, 1995 [JP] Japan ..................... 7-299249
Dec. 19, 1995 [JP] Japan ..................... 7-330201

[51] Int. Cl.$^6$ ............... G11B 5/72; B23K 26/00
[52] U.S. Cl. .................. 428/694 TR; 428/65.3; 428/141; 428/694 TP; 428/694 SG; 219/121.6; 219/121.65; 219/121.66; 219/121.76; 219/121.78
[58] Field of Search .............. 428/694 TS, 694 TP, 428/694 TR, 694 SG, 65.3, 141; 219/121.6, 121.65, 121.66, 121.76, 121.78

[56] References Cited

U.S. PATENT DOCUMENTS

| | | | |
|---|---|---|---|
| 4,997,696 | 3/1991 | Kamada et al. | 428/141 |
| 5,062,021 | 10/1991 | Ranjan et al. | 360/135 |
| 5,277,960 | 1/1994 | Tsuya et al. | 428/119 |
| 5,549,954 | 8/1996 | Otsuka et al. | 428/65.3 |
| 5,599,590 | 2/1997 | Hayashi et al. | 427/448 |
| 5,652,040 | 7/1997 | Yamada et al. | 428/141 |
| 5,681,636 | 10/1997 | Marshall | 428/65.3 |
| 5,820,969 | 10/1998 | Satoh | 428/141 |

*Primary Examiner*—Nam Nguyen
*Assistant Examiner*—Steven H. VerSteeg
*Attorney, Agent, or Firm*—Oblon, Spivak, McClelland, Maier & Neustadt, P.C.

[57] ABSTRACT

The present invention relates to a magnetic recording medium comprising at least a magnetic layer, optionally by means of an under layer and an intermediate layer thereon, on a non-magnetic substrate and, occasionally a protective layer disposed on the magnetic layer, wherein projections each of a shape having a plurality of protrusions per one projection are formed by the number of from 10 to $10^6$ per 1 mm$^2$ by irradiation of energy beam to a surface of at least one of the substrate, the under layer, the intermediate layer, the magnetic layer and the protective layer.

23 Claims, 7 Drawing Sheets

MAGNETIC RECORDING MEDIUM AND METHOD OF PRODUCING THE SAME

BACKGROUND OF THE INVENTION

The present invention relates to a magnetic recording medium and a method of producing the same and, more specifically, it relates to a thin film type magnetic recording medium used for a hard disk drive and a method of producing the same, capable of improving a CSS (contact start and stop) property and a sticking property of the magnetic head to the surface of the magnetic recording medium, and simultaneously capable of lowering a flying height of the magnetic head.

Usually, information is written into and read out of a recording medium by means of a magnetic head, in which the disk is rotated at a high speed to hover the magnetic head. In the disk, texturing for applying a mechanical polishing is applied to make texturing traces (texture pattern) on the surface of the disk concentrically in the circumferential direction of the disk (hereinafter referred to as mechanical texture) for improving a magnetic characteristic. Generally, the mechanical texture is applied on the surface of the non-magnetic substrate or on an under layer such as an Ni-P layer plated thereon.

Since a recent increasing of data amount and demand for miniaturizing and the light weighting the device, the linear recording density and track density are increased, so that scratches caused by the existent mechanical texture result in a reading or writing error at a high probability.

Accordingly, it has been proposed a method of applying the mechanical texture only in a CSS zone at the inner circumference of the disk while leaving a data recording zone as it is. However, the surface of the data recording zone is made higher than the height for the surface of the CSS zone, to bring about a problem that the magnetic head crushes upon seeking.

Further, a method of making the texture pattern by a laser beam (hereinafter referred to as laser texture)has also been proposed instead of the mechanical texture. For instance, in U.S. Pat. specifications Nos. 5,062,021 and 5,108,781, there is proposed an attempt of locally melting a Ni-P layer by a Q-switch laser beam of Nd-YAG, in which a pulse width is very narrow and an energy density is very high, and forming crater-like projections, thereby improving the CSS property with respect to the magnetic head by the circular rim of the protrusions.

However, by the texture pattern produced by the laser texture disclosed in above-mentioned patents, the area of contact with respect to a lower surface of the magnetic head is not decreased outstandingly, and it can not be deemed that the problem of sticking between the magnetic head and the disk is improved more compared with the mentioned using mechanical texture.

Further, a method of forming projections by using photolithography has also been proposed. For instance, preprint for Tribology published by The Japan Society of Tribologists (1991-5, A-11), (1992-10, B-6) show the result of CSS test for disks having concentric projections formed by photolithography at a 0.1 to 5% area ratio relative to the entire surface of the disk.

However, since the top of the projection formed by in the above-mentioned method is flat, it involves a drawback that the frictional force is increased along with the sliding cycles of the magnetic head and that industrial application is not easy.

SUMMARY OF THE INVENTION

The present invention has been accomplished in view of the foregoing situations and the object of the present invention is to provide a magnetic recording medium capable of preventing sticking of a magnetic head by decreasing the area at the top end of a projection in a CSS zone of the magnetic recording medium, reducing the fluctuation for the stable flying height of the magnetic head when the magnetic head seeks between a data recording zone and the CSS zone, and causing neither head crush nor instabilization of the magnetic head in a space. The foregoing object of the present invention can be attained by each of the following aspects.

In a first aspect of the present invention, there is provided a magnetic recording medium having at least a magnetic layer, optionally by means of an under layer and an intermediate layer thereon, on a non-magnetic substrate, and, occasionally, having a protective layer disposed on the magnetic layer, wherein projections each of a shape comprising a plurality of protrusions per one projection are formed by the number of 10 to $10^6$ per 1 $mm^2$ by the irradiation of an energy beam to the surface of at least one of the substrate, the under layer, the intermediate layer, the magnetic layer and the protective layer.

In a second aspect of the present invention, there is provided a magnetic recording medium having at least a magnetic layer, optionally by means of an under layer and an intermediate layer thereon, on a non-magnetic substrate, and, occasionally, having a protective layer disposed on the magnetic layer, wherein a plurality of projections each comprising a protrusion and a depression in adjacent therewith, the protrusion having a maximum peak height (Rp) of from 2 to 60 nm and an area of a figure surrounded by a contour line at a height 1 nm below the top end of not more than 1 $\mu m^2$ in average are formed to the surface of at least one of the substrate, the under layer, the intermediate layer, the magnetic layer and the protective layer, and the projection is formed as a portion of a crater-like rim having a difference in the height of the rim and having a rim portion asymmetric with respect to the center.

In a third aspect of the present invention, there is provided a method of producing a magnetic recording medium of forming projections by irradiating a pulsed laser beam to the surface of at least one of a substrate, an under layer, an intermediate layer, a magnetic layer and a protective layer thereby melting or softening the surface, which comprises irradiating a plurality of laser beams while moving a relative position of spots on the irradiation surface of the laser beam and controlling the beams so that the distance between each of the beam centers is not more than 20 $\mu m$.

In a fourth aspect of the present invention, there is provided a method of producing a magnetic recording medium of forming projections by irradiating a pulsed laser beam to the surface of at least one of a substrate, an under layer, an intermediate layer, a magnetic layer and a protective layer, thereby melting or softening the surface, which comprises irradiating a laser beam while moving a relative position of a spot on the irradiation surface of the laser beam and controlling so that a ratio (R) for a major axis to a minor axis of an elliptic beam spot is not less than 2.

In a fifth aspect of the present invention, there is provided a method of producing a magnetic recording medium, which comprises irradiating a laser beam with a distribution of an energy density being asymmetric with respect to the spot center (in rotational asymmetry) to the surface of at least one of a substrate, an under layer, an intermediate layer, a magnetic layer and a protective layer thereby forming projections each comprising a protrusion and a depression in adjacent there-with, the protrusion having an area of a figure surrounded by a contour line at a height 1 nm below the top end of a raised center line (Rp) of not more than 1 $\mu m^2$ in average.

In a sixth aspect of the present invention, there is provided a method of producing a magnetic recording medium comprising irradiating a plurality of laser beams of different intensity each at such an interval as exerting a thermal effect on the surface of at least one of a substrate, an under layer, an intermediate layer, a magnetic layer and a protective layer, thereby forming projections each comprising a protrusion and a depression adjacent therewith, the protrusion having a area of a figure surrounded by a contour line at a height 1 nm below the top end of not more than 1 $\mu m^2$ in average.

DETAILED DESCRIPTION OF THE INVENTION

The present invention will be explained in more detail.

A magnetic recording medium according to the first aspect of the present invention will at first be explained.

The magnetic recording medium of the present invention comprises at least a magnetic layer, optionally by means of an under layer and an intermediate layer thereon, on a non-magnetic substrate and, occasionally, a protective layer disposed on the magnetic layer. In the following descriptions, the non-magnetic substrate is sometimes referred to simply as "substrate".

In the present invention, an aluminum alloy substrate, a glass substrate or a silicon substrate can be used suitably as the substrate, and further a substrate composed of other metal such as copper or titanium, a ceramic substrate or a resin substrate may also be used. For the silicon substrate, a pure silicon substrate, as well as a silicon alloy substrate containing a trace amount of elements for increasing the strength can be used. The substrate is usually formed as a disk-shape and further a substrate of any other shape such as a card-shaped substrate may also be used.

In the present invention, the magnetic recording medium can be constituted by forming the magnetic layer directly on the surface of the substrate, but the magnetic layer is usually formed by means of an under layer formed on the surface of the substrate. As the under layer, a non-magnetic under layer composed of an Ni-P alloy is suitable and such an under layer is formed usually by an electroless plating method or sputtering method. The thickness of the under layer is, usually, from 50 to 20,000 nm, preferably from 100 to 15,000 nm.

An intermediate layer such as a Cr layer or a Cu layer is preferably disposed between the substrate or the under layer and the magnetic layer. The thickness of the intermediate layer is, usually, from 20 to 200 nm, preferably from 50 to 100 nm. The magnetic layer (magnetic recording layer) comprises a ferromagnetic thin alloy film such as composed of Co—P, Co—Ni—P, Co—Ni—Cr, Co—Ni—Pt, Co—Cr—Ta, CoCr—Pt or Co—Cr—Ta—Pt-based alloy and is formed, for example, by an electroless plating, electric plating, sputtering or vapor deposition method. The thickness of the magnetic recording layer is usually about from 30 to 70 nm.

A usually protective layer is disposed on the surface of the magnetic recording layer. The protective layer comprises a carbon film, a hydrogenated carbon film, carbide film such as composed of TiC or SiC, a nitride film such as composed of SiN or TiN, or an oxide film such as composed of SiO, $Al_2O_3$ or ZrO, and is formed by a method, for example, of a vapor deposition method, sputtering method, plasma CVD method, ion plating method or wetting process. As the protective layer, the carbon film or the hydrogenated carbon film is particularly preferred.

Further, a lubricant layer is usually disposed on the surface of the protective layer. For the lubricant, for example, a liquid fluorocarbon-based lubricant is used suitably and the lubricant layer is usually formed on the surface of the protective layer, for example, by a dipping method. However, in a case of using a magnetic head having a diamond-like carbon layer on a slider surface, since tribologic property between the magnetic head and the magnetic recording medium is improved, it is not always necessary for providing the protective layer or lubricant layer.

In the recording medium according to the present invention as described above, projections each comprising a plurality of protrusions per one projection are formed by the number of 10 to $10^6$ per 1 mm² by the irradiation of an energy beam to the surface of at least one the substrate, the under layer, the intermediate layer, the magnetic layer and the protective layer. The surface formed with the projections means a side to be in contact with the magnetic head. The density of projection(N/mm²) means not an average density for the entire magnetic recording medium but means a density per unit area in a region in which the projections exist (here and hereinafter).

In the present invention, the projection of a shape each comprising a plurality of protrusions per one projection means that one projection formed by irradiation of the energy beam for once has a plurality of protrusions. As the energy beam, there can be mentioned a pulsed laser beam, electron ray and X-ray, with the pulsed laser beam being suitable.

Figure 5:
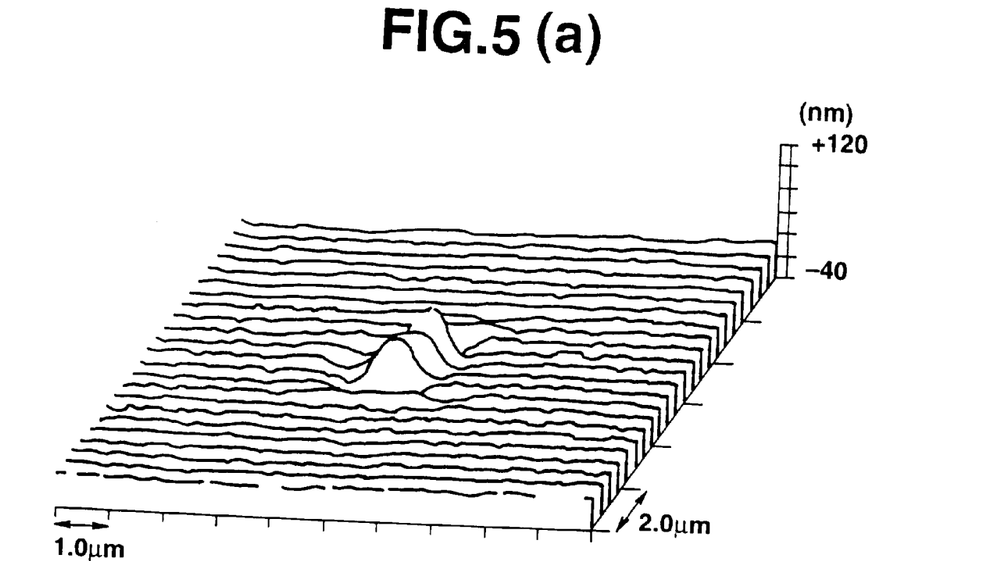
FIG. 5(a) is a perspective view illustrating the shape of a projection obtained in Example 1.
FIG. 5(b) is a vertical cross sectional view of a plane passing through the center of the projection and parallel with a scanning direction of energy beams (laser beams) illustrating the shape of a projection formed in Example 1.
Figure 6:
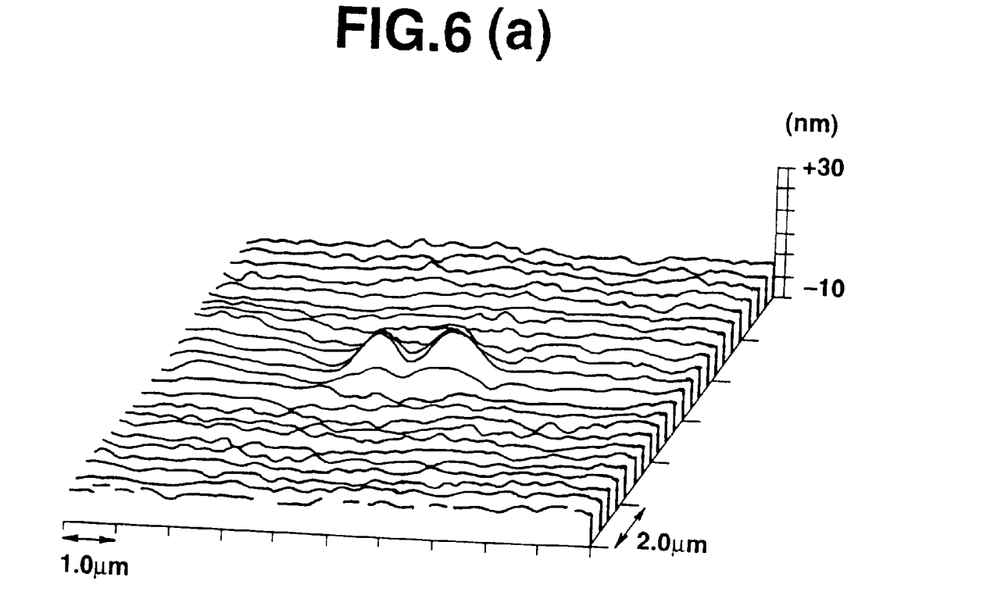
FIG. 6(a) is a perspective view illustrating the shape of a projection obtained in Example 2.
FIG. 6(b) is a vertical cross sectional view of a plane passing through the center of the projection and parallel with a scanning direction of energy beams (laser beams) illustrating the shape of a projection formed in Example 2.
Figure 7A:
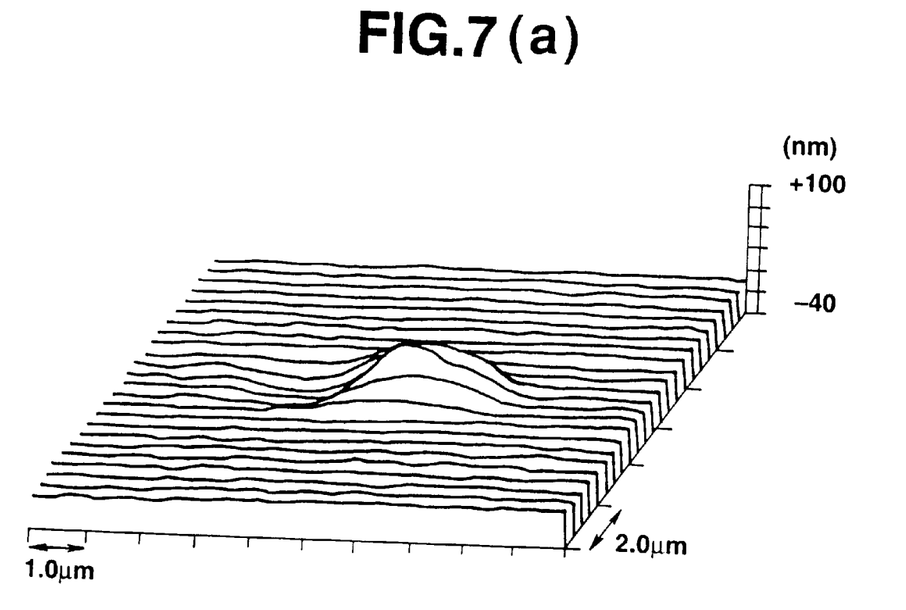
FIG. 7(a) is a perspective view illustrating the shape of a projection obtained in Example 3.
Figure 7B:
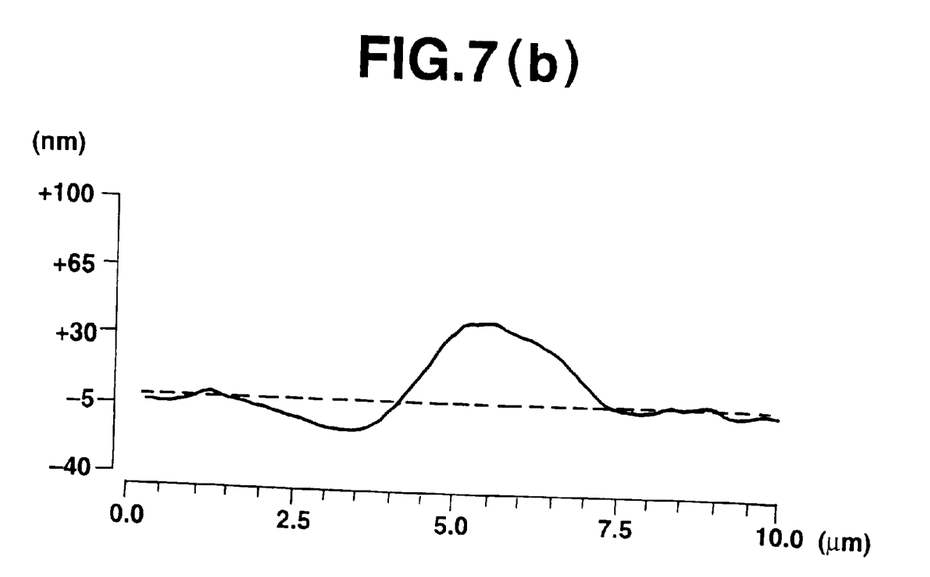
FIG. 7(b) is a vertical cross sectional view of a plane passing through the center of the projection and parallel with a scanning direction of energy beams (laser beams) illustrating the shape of a projection formed in Example 3.

FIG. 5(a), FIG. 5(b), FIG. 6(a) and FIG. 6(b) are explanatory views illustrating the shapes of projections obtained in examples to be described later, which are measured by a surface shape-measuring device utilizing laser beam interference (for example, ZYGO. trade name, manufactured by ZYGO CoRp. in U.S.A). FIG. 5(a) and FIG. 6(a) are a perspective view and, FIG. 5(b) and FIG. 6(b) are a vertical cross sectional view of a plane passing through the center of the projection and in parallel with the scanning direction of the energy beam (laser beam). In a case of a disk-shaped substrate, the scanning direction of the laser beam is usually in a circumferential direction.

As shown in FIG. 5(a), FIG. 5(b), FIG. 6(a) and FIG. 6(b) (particularly in FIG. 5(b) and FIG. 6(b)), the projection in the present invention usually has a concave (depression) formed in contiguous there-with but the projection is not surrounded by the concave. The projection shown in each of the figures, has two protrusions.

The number of protrusions provided to the projection in the present invention is usually two but, not necessarily, two. The projection itself is formed corresponding the irradiation of the energy beam for once, and a plurality of protrusions are formed simultaneously by the laser beam irradiation for once. As shown in FIG. 5(a), FIG. 5(b), FIG. 6(a) and FIG. 6(b) (particularly, in FIG. 5(b) and FIG. 6(b)), the height of depression formed between each of a plurality of the protrusions varies and the depression between the protrusions may sometimes be formed at a position higher than the average roughness line on the projection-forming surface as shown in FIG. 5(a) and FIG. 5(b). The height of the depression between the protrusions differs depending on the irradiation condition of the energy beam or the material of the projection-forming surface, and the condition can be properly selected so that a projection of a desired shape can be formed.

Further, in the present invention, it is able to form a projection having a ratio (R) for a major axis to a minor axis of not less than 2 for the melted or softened portion at the bottom of the projection, by selecting the method of forming the projection. Usually, the major axis is controlled to not more than 10 μm, while the minor axis is controlled to not more than 5 μm. Although the mechanism of forming the projection is not always apparent at present, it will be described later in conjunction with the explanation for the method of producing the magnetic recording medium for the sake of understanding the shape of the projection.

In the present invention, the density of projection is selected within a range from 10 to $10^6$ (N/mm²), preferably, within a range from $10^2$ to $10^5$ and, more preferably, from $10^3$ to $10^4$. If the density of projection is less than 10 (N/mm²), it is difficult to support the lower surface of the magnetic head only by the projections because of the undulation of the substrate or the like. On the other hand, if the density of projection exceeds $10^6$, it is difficult to make the height of the projection uniform.

In the present invention, the height of projection is selected within a range, preferably, from 1 to 100 nm, further preferably, from 1 to 50 nm and, particular preferably, from 5 to 30 nm. If the height of projection exceeds 100 nm, although the CSS property is satisfactory, the stable flying height of the magnetic head can not be reduced. On the contrary, if the height of projection is less than 1 nm, the projection is buried in fine unevenness inherent to the substrate, failing to obtain a desired effect. The height of projection represents the height of projection on the basis of the center line for a roughness curve defined according to the surface roughness of JIS (BO601-1982).

Further, in the present invention, it is preferred that an average area of a figure surrounded by a contour line at a height 1 nm below the top end of the protrusion (hereinafter referred to as "contour line area (1)") is not more than 1 μm². If the contour line area (1) exceeds 1 μm², sticking is liable to occur between the magnetic recording medium and the magnetic head, tending to lower the CSS property. The contour line area (1) is preferably not more than 0.5 μm², more preferably not more than 0.2 μm², still more preferably not more than 0.1 μm².

Further, in the present invention, an average area of a figure surrounded by a contour line at a half height of the protrusion (hereinafter referred to as "contour line area (2)") is preferably not more than 5 μm². That is, although undesired effects may sometimes be given on the CSS property depending on the lubricant used, the CSS property can be improved by satisfying the above-mentioned condition. The contour line area (2) is preferably not more than 2 μm². The contour line area (2) in a case where adjacent protrusions are linked to each other at a half height position of the protrusion means a value obtained by dividing the area of one overlapped protrusion with the number of protrusions.

The protrusion in the preferred embodiment of the present invention described above can provide the effect of preventing adsorption of the magnetic head to the surface of the magnetic recording medium by the lubricant because the shape at the top end thereof is abrupt. The contour line area and the shape at the top end of the protrusion can be measured by "ZYGO" described previously.

In a preferred embodiment of the present invention, the projections are formed only in the CSS zone. According to this embodiment, since a slight circumferential mechanical texture or the like can be adopted only with an aim of orientation for the magnetic layer in the data recording zone, the surface can be made more smooth. As a result, errors due to deep scratch flaws as observed in coarse mechanical texture with an aim of improving the CSS property of the prior art can be reduced.

In another preferred embodiment of the present invention, the projections are formed substantially only in a zone for CSS operation. However, if the projections are formed in the data recording zone, the height of the projections should be lower than that of the projections in the CSS zone.

In a further preferred embodiment of the present invention, the projections are formed such that the height of projection in the CSS zone is decreased toward the data recording zone, and the density of projection is increased in a region where the height of projection is lower. According to such embodiment, the flying height of the magnetic head in the data recording zone can be reduced to the lowest limit. Further, the CSS operation can be conducted while seeking the magnetic head with the bottom of the magnetic head being in contact with the projections in a state in which the magnetic recording medium rotates.

In the case of forming projections in the data recording zone, it is preferred to decrease the height of projection and the density of projection. This is for lowering the flying height of the magnetic head in the data recording zone as much as possible, and preventing the magnetic head from adsorbing on the surface of the magnetic recording medium if the magnetic head stops on the data recording zone by an accidental trouble. Usually, it may suffice that CSS operation in the data recording zone can be conducted by about 100 cycles. Further, it is preferred that the height of projection in the data recording zone is not more than ½ of that in the CSS zone, while the density in the data recording zone is about from $1/10$ to $1/10^4$ of that in the CSS zone.

Then, explanation will be made to a magnetic recording medium according to the second aspect of the present invention. The magnetic recording medium according to the second aspect of the present invention comprises at least a magnetic layer, optionally by means of an under layer and an intermediate layer thereon, on a non-magnetic substrate and, occasionally, a protective layer disposed on the magnetic layer, wherein a plurality of projections each comprising a protrusion and a depression in adjacent therewith, the protrusion having a maximum peak height (Rp) from 2 to 60 nm and having an area of a figure surrounded by a contour line at a height 1 nm below the top end of not more than 1 $\mu m^2$ in average are formed to the surface of at least of one of the substrate, the under layer, the intermediate layer, the magnetic layer and the protective layer, and the projection is formed as a portion of a crater-like rim having a difference in the height of the rim and having a rim portion asymmetric with respect to the center. The height and the density of the projection in the recording medium according to the second aspect of the present invention are identical with those in the magnetic recording medium according to the first aspect. Further, the contour line areas (1) and (2) in the second aspect are also identical with those in the first aspect. Further, the projections are preferably formed only in the CSS zone like that the magnetic recording medium according to the first aspect. Other preferable factors concerning the projection-forming region are identical with those in the case of the magnetic recording medium according to the first aspect.

Then, explanation will then be made to a method of producing a magnetic recording medium according to the third aspect of the present invention. In the producing method according to the third aspect of the present invention, projections are formed by irradiating a pulsed laser beam to the surface of at least one of a substrate, an under layer, an intermediate layer, a magnetic layer and a protective layer, thereby melting or softening the surface. Forming the projection by the irradiation of the laser beam can be referred to as texturing. Then, the producing method of the magnetic recording medium according to the third aspect of the present invention is used mainly for producing the magnetic recording medium according to the first aspect of the present invention.

Figure 1:
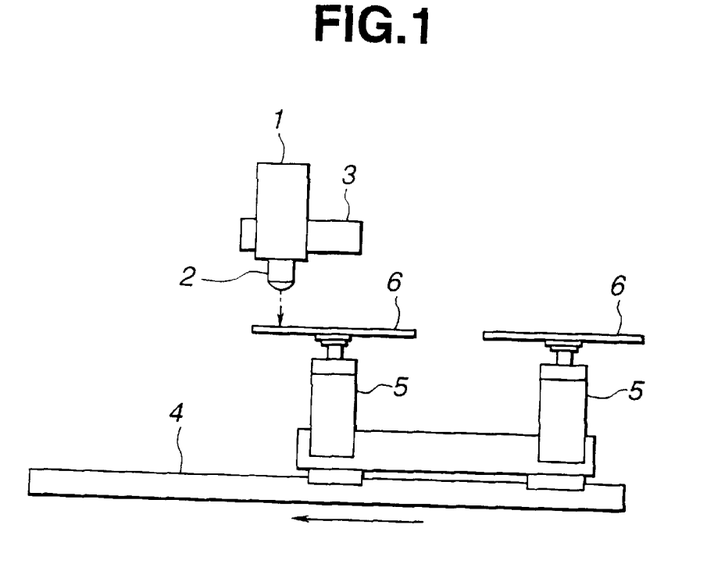
FIG. 1 is an explanatory view for a basic constitution of one embodiment of a laser beam irradiation device used in the present invention.

In the producing method according to the third aspect of the present invention, a pulsed laser beam irradiation device using a solid-state laser beam source, which is inexpensive and excellent in durability (for example, a Q-switch pulsed solid-state laser beam) is suitable as the laser beam irradiation device (texturing device). FIG. 1 is an explanatory view for the basic constitution of one embodiment of a laser beam irradiation device used in the present invention, FIG. 2 is a fragmentary explanatory view of the laser beam irradiation device illustrated FIG. 1 which is an explanatory view for one embodiment of the solid-state laser generation device and FIG. 3 is a fragmentary explanatory view of the laser beam irradiation device illustrated in FIG. 1, which is an explanatory view for another embodiment of the solid-state laser generation device.

A laser beam irradiation device illustrated in FIG. 1 mainly comprises a pulsed laser beam generation means 1, a light condensing means 2, a spot moving device 3, a substrate moving means 4 and substrate rotating means 5, 5. The pulsed laser beam generation means 1 comprises, in view of functional, a laser beam generation means using a solid-state laser beam source and optical modulation means for modulating the laser beam to generate a pulsed laser beam. In the drawing, reference numeral 6 indicates a substrate. While two substrate rotating means 5 are illustrated, the number of them is optional.

Figure 2:
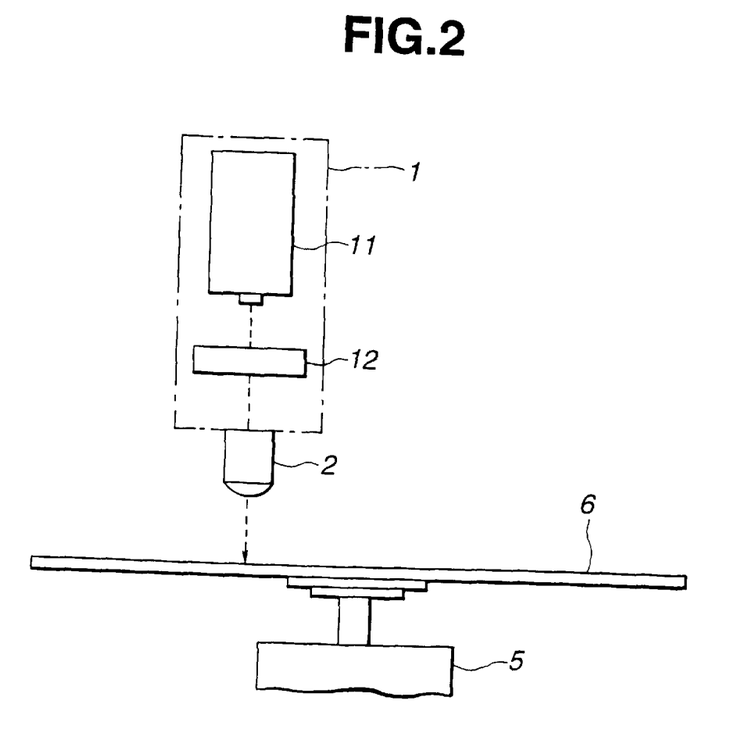
FIG. 2 is a fragmentary explanatory view of the laser beam irradiation device shown in FIG. 1, which illustrates one embodiment of a solid-state laser generation device.
Figure 3:
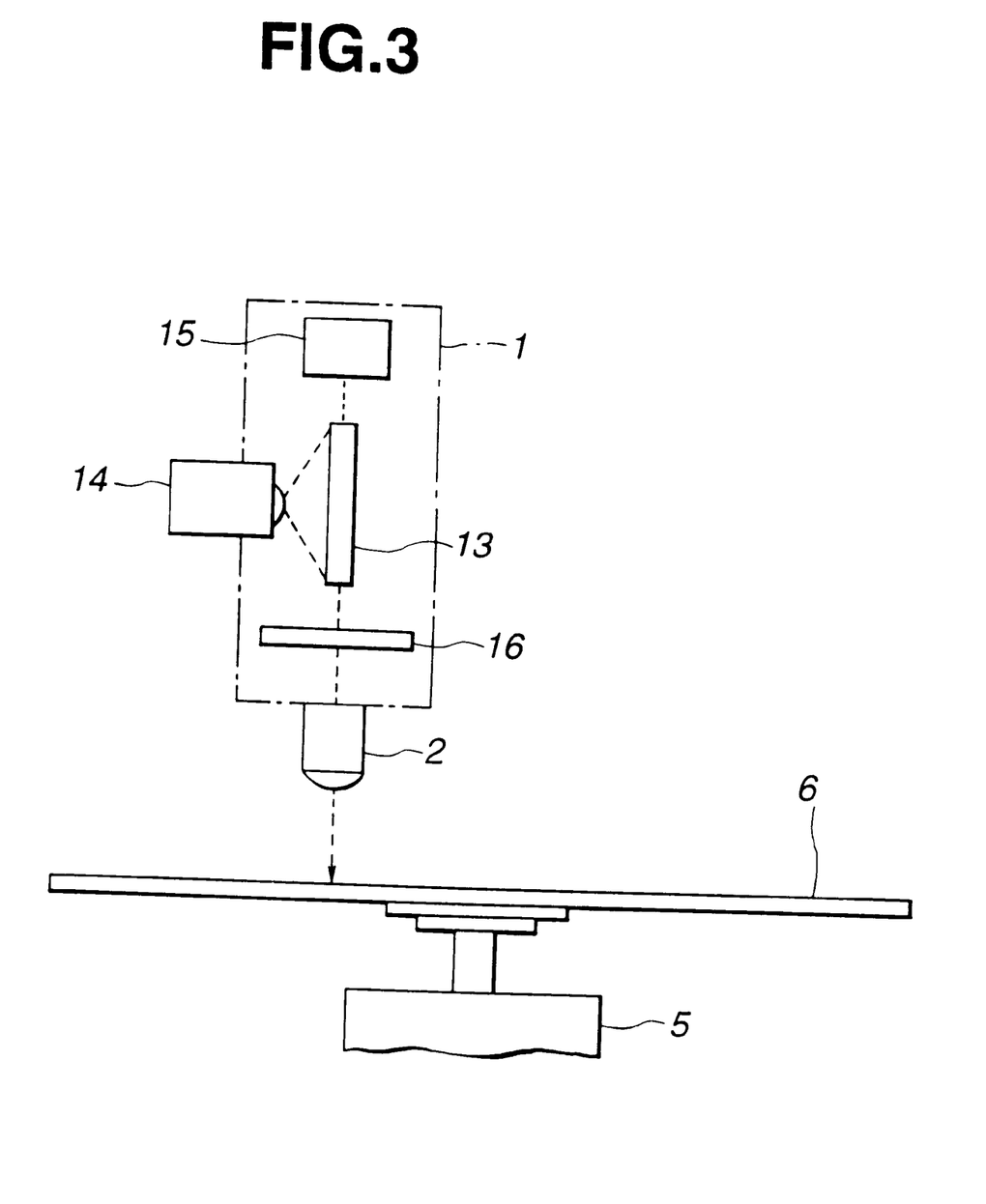
FIG. 3 is a fragmentary explanatory view of the laser beam irradiation device shown in FIG. 1 which illustrates another embodiment of the solid-state laser generation device.

The pulsed laser beam generation means 1 illustrated in FIG. 2 comprises a laser beam generation means 11 and an optical modulation means 12. As the laser beam generation means 11 using the solid-state laser beam source, an YAG solid-state laser generation device is suitably used for instance, and the YAG solid-state laser generation means continuously oscillates a laser beam being driven by a power source device (not illustrated).

As the optical modulation means 12, acousto-optical device, electro-optical device or mechanical means such as shutter can be mentioned for instance. The electro-optical device has a function of ON/OFF control for the laser beam by using crystals in which the optical property is changed by the application of an electric field and has a feature that a rising time is short. Accordingly, in the constitution shown in FIG. 2, an electro-optical device is used suitably as the optical modulation means 12 for controlling the beam irradiation time at a high accuracy.

The laser beam emitted continuously by the laser beam generation means 11 is converted into a pulsed laser beam by the optical modulation means 12.

A pulsed laser beam generation means 1 illustrated in FIG. 3 utilizes a so-called Q-switch solid-state laser having a modulator incorporated in a laser oscillator. Generally speaking, the Q-switch solid-state laser has a structure of oscillating laser by exciting crystals, for example, of YAG or YLF by an external light source and switching the Q-value (reflectance) of a resonator having laser crystals contained at the inside.

That is, in a state where the Q-value of the resonator is low, laser oscillation does not occur and energy given from the external light source is stored in the crystals. Then, when the Q-value of the resonator is increased, the energy is emitted at once as a laser beam by stimulated emission. Therefore, the Q-switch solid-state laser can provide a laser pulse at high power with a relatively small-sized device. Accordingly, it has a feature that the energy efficiency is higher compared with the method of converting the continuously emitted laser beam source into pulses by an external modulator, that is, a method shown in FIG. 2.

The pulsed laser beam generation means 1 illustrated in FIG. 3 comprises a solid-state laser crystal rod 13, an external light source 14, a Q-switch 15 and a partially transmission type reflection mirror 16. As the solid-state laser crystal rod 13, a crystal rod, for example, of YAG or YLF is used preferably. As the external light source 14, a xenon lamp or a semiconductor laser light source (laser diode) can be mentioned. The laser diode is inexpensive and small in size, and has relatively long life. Accordingly, in the present invention, the laser diode is used preferably as the external light source 14. The Q-switch 15 has a function of changing the reflectance by an external electric instruction.

As an actual embodiment of the Q-switch 15, there can be mentioned, for example, an electro-optical Q-switch using a material having refractive index which is changed by the application of a voltage (electric field) (Kerr effect or Pockels effect) and a supersonic (acousto-optical) Q-switch having a diffraction rate which is changed by the application of supersonic waves to the acousto-optical device.

In the pulsed laser beam generation means 1 illustrated in FIG. 3, the external light source 14 continuously emits light being driven by a power source device (not illustrated), to excite the energy state of the solid-state laser crystal rod 13. Then, a pulsed laser beam is out-putted by providing a control signal from an external control device (not illustrated) thereby increasing the Q-value of the Q-switch 15 only for a desired period of time.

Excited crystals have a property of emitting an energy in the form of photons at an identical wavelength and aligned phase by interaction between photons having resonating wavelength. This is called to as stimulated emission. In a state where the Q-value is low, photons generated at the inside are removed out of the system and stimulated emission does not occur in which crystals are excited to a high energy level by the external optical source. When a state of high Q-value is reached, a probability that the photons are confined in the system is increased to cause stimulated emission. Further, a sort of chain reaction is caused in which photons generated as a result of stimulated emission causes further stimulated emission, so that the energy stored in the crystals is emitted in an extremely short period of time as an optical beam at a determined wavelength and an aligned phase.

In various application uses, the Q-switch laser is used for obtaining a laser beam of a short pulse width and a high peak power, but a constant (long) pulse width is required in the present invention. In the Q-switch laser, generation of such a laser pulse is attained by causing stimulated emission in a state of low Q-value and causing stimulated emission in a state where the storage of the energy in the crystals is low. Practically, this may be attained, in a case of electro-optical Q-switch by moderating the rising of Q-value, for example, by moderating rising of a voltage given to the Q-switch.

In the laser beam irradiation device illustrated in FIG. 1, a usual light condensing means (objective lens) can be adopted as the light condensing means 2 so long as a desired minute spot can be obtained. The light condensing means 2 is used usually in combination with an auto-focusing (AF) system. For the spot moving means 3 and the substrate moving means 4, a linear slider is used preferably for instance. The spot moving means 3 carries the pulsed laser beams generation means 1 and the light condensing means 2 and moving them integrally in a linear direction. The substrate moving means 4 carries a substrate rotating means to be described later and integrally moves it in a linear direction.

In the laser beam irradiation device used in the present invention, the spot moving means has a function of continuously changing the position of the spot on the texturing surface, and such a positional change is given as a relative relationship between the spot and the texturing surface.

Accordingly, it may suffice for the laser beam irradiation device illustrated in FIG. 1 to provide either one of the spot means 3 or the substrate means 4. Usually, it is preferred to move the spot itself by the spot moving means 3.

As the substrate rotating means 5 in the laser beam irradiation device illustrated in FIG. 1, a spindle motor is used preferably, for instance, in which the substrate 6 is supported to a rotational shaft of the spindle motor and moved at a constant number of rotation or linear speed.

The producing method according to the third aspect of the present invention comprises, upon forming projections, irradiating a plurality of laser beams while moving a relative position of a spot on the irradiation surface of the laser beam and such that the distance between each of the beam centers is not more than 20 $\mu$m. Specifically, a plurality of adjacent beams with power controlled at a high accuracy are condensed and irradiated on a projection-forming surface. The distance between each of the centers for a plurality of beams is preferably from 2 to 5 $\mu$m. Further, the diameter of the condensed beam spot is preferably reduced as much as possible for forming a sharp projection.

Figure 4:
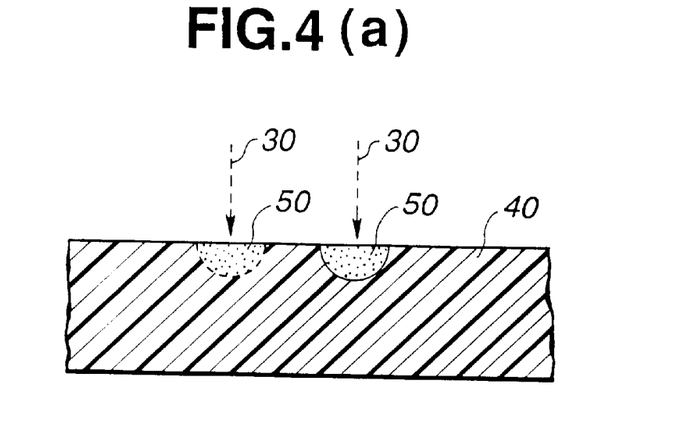
FIG. 4(a) is an assumed conceptional view illustrating a formation mechanism of a projection when pulse laser beams are irradiated in the present invention.
FIG. 4(b) is an assumed conceptional view illustrating a formation mechanism of a projection when solidification starts in the present invention.
FIG. 4(c) is an assumed conceptional view illustrating a formation mechanism of a projection when depression is formed in the present invention.

The mechanism of forming the projection in the present invention has not yet been apparent at present but it is assumed as below. FIG. 4(a), FIG. 4(b) and FIG. 4(c) are an assumed conceptional view for the mechanism of forming projections in the present invention. As shown in FIG. 4(a), when a plurality of pulse laser beams 30 are irradiated, a plurality of locally over-heated spot portions 50, for example, at an under layer 40 on the substrate are melted in a shape similar to that of the spot. It seems that the pulse width is short, it scarcely undergoes the effect of the rotation of the substrate.

Then, the molten region is cooled by the lowering of temperature due to thermal diffusion and solidified. In this case, temperature lowers more moderately on respective sides of the molten portion irradiated being close to each other than on the opposite sides and, as a result, solidification starts at portions 60 most remote from each of the spots as shown in FIG. 4(b). That is, the distance between each of the centers for the spots is a distance in which the thermal effect is exerted, preferably not more than 10 $\mu$m, more preferably not more than 5 $\mu$m.

Generally, in a molten liquid, a surface tension is greater on the side at a lower temperature, and a portion cooled to a lower temperature after irradiation intakes a liquid of a portion at a higher temperature to form a projection. As a result, as shown in FIG. 4(c), a depression 70 is formed at a finally solidified portion and protrusions 80, 80 are formed on both sides of the depression to form a projection in the present invention.

If the distance between each of the beams is too close or depending on other conditions, the depression between the spots is small and the depression may sometimes situate at a position higher than an average roughness line on the surface. In this case, the depression may be formed at the periphery of the projection.

Then, explanation will be made to a method of producing a magnetic recording medium according to the fourth aspect of the present invention. The producing method comprises, upon forming projections, irradiating a laser beam while moving a relative position of a spot on the irradiation surface of the laser beam and controlling the laser beam so as to form an elliptic beam spot having a ratio (R) for a major axis to a minor axis of not less than 2. The producing method according to the fourth aspect of the present invention is mainly used for the magnetic recording medium according to the first aspect of the present invention.

In the producing method described above, different from the producing method of irradiating a plurality of laser beams, a pulsed laser beam controlled so as to form an elliptic beam spot is irradiated to a projection-forming surface, thereby forming a projection utilizing a temperature difference in a molten portion. By such a method, a projection having a ratio (R) for a major axis to a minor axis of not less than 2 is formed to a molten or softened portion at the bottom of the projection. Usually, the major axis is not more than 10 μm while the minor axis is not more than 5 μm.

In any of the producing methods described above according to the present invention, the spot diameter of the pulsed laser is preferably not more than 3 μm. The distance between each of the centers for the spots in the producing method according to the third aspect of the present invention is preferably from 2 to 5 μm. Further, the total power for 1 spot of the irradiated portion is usually not less than 50 mW and not more than 1 W, preferably not less than 50 mW and not more than 700 mW. The irradiation time is usually not more than 200 ns, preferably not more than 100 ns, more preferably not more than 50 ns while the irradiation time depends on the number of rotation of the substrate. In the present invention, the spot diameter of the laser beam means a spot diameter at which 84% of the energy is concentrated, and the spot diameter can be defined as follows;

$$spot\ diamater(\mu m) = (1.22 \times \lambda(\mu m))/NA$$

wherein a λ is a wavelength of the laser beam and an NA is a numerical aperture of an objective lens used as the light condensing.

In any of the producing methods described above, the laser beam is irradiated preferably under such conditions that the scanning parameter defined as $P = \delta V/D$ is not more than 0.25, assuming the pulse width as δ, the relative velocity between the laser spot and the irradiation surface by the laser beam as V, and the maximum diameter of the laser beam spot in the direction parallel with the relative moving direction as D.

In the projection formed by the producing method according to the third and the fourth aspects of the present invention, the top is not flat but has a moderate curvature. If the distance between the laser beams is extremely small or the power of the laser beam is too high, a circular molten range is enlarged in which a finally solidified central portion is depressed to form a crater-like rim at the periphery like that described in the specifications of U.S. Pat. Nos. 5,062,021 and 5,108,781.

On the other hand, in the producing method, particularly, according to the third aspect of the present invention, since each of the laser beams is restricted into a narrow range and the distance between each of the beams is determined to an optimum value, a projection of a unique shape is formed having a depression between the beams and an abrupt protrusion to the outer beam portion opposite to the depression, which is greatly different from the projection as disclosed in the above-mentioned U.S. patents. The area at the top end of the thus formed projection is extremely small and the projection is preferred for CSS.

In the producing method according to the third and the fourth aspects of the present invention, the height of protrusion can be controlled optionally by adjusting, for example, the area of the laser spot, the distance between the spots and the power. In a case where the laser beam is scanned in a circumferential direction, the density of projections can be controlled optionally by adjusting the conditions for the number of projections per one circumference, the irradiation interval in the radial direction of the pulse laser and the height of projection. The irradiation area of the laser beam can be changed usually by changing the numerical aperture of the objective lens. The irradiation diameter of the beam can be controlled about from 12 to 0.7 μm by using an objective lens having a numerical aperture from 0.05 to 0.95.

Then explanation will be made to a method of producing a magnetic recording medium according to fifth and sixth aspects of the present invention. The producing methods are used mainly for the magnetic recording medium according to the second aspect of the present invention. Accordingly, explanation to the contents identical with those already explained with regard to the magnetic recording medium according to the second aspect of the present invention is sometimes omitted.

The producing method according to the fifth aspect of the present invention, comprises irradiating a laser beam having a distribution of an energy density that is asymmetric relative to a spot center (not in rotational symmetry) to a surface of at least one of a substrate, an under layer, an intermediate layer, a magnetic layer and a protective layer, thereby forming a projection having a protrusion and a depression in adjacent therewith, the protrusion having not more than 1 $\mu m^2$ in average of an area of figure surrounded by a contour line at a height 1 nm below the top of a maximum peak height (Rp). The producing method according to the sixth aspect of the present invention comprises irradiating a plurality of laser beams of different intensity each at such an interval as exerting a thermal effect to a surface of at least one of a substrate, an under layer, an intermediate layer, a magnetic layer and a protective layer, thereby forming a protrusion and a depression in adjacent therewith, the protrusion having not more than 1 $\mu m^2$, in average, of an area of figure surrounded by a contour line at a height 1 nm below the top.

As an actual method for each of the producing methods described above, it may be considered a method of making a laser spot asymmetric thereby forming a temperature distribution which is asymmetric relative to the center of a molten portion, or a method of using a plurality of laser beams of different intensity. An asymmetric laser spot having a distribution different from a usual Gaussian distribution can be prepared also by simply disposing a slit or the like in an optical system of the laser beam, or overlapping a plurality of laser beams. However, a method of applying, among a plurality of laser beams, a low energy laser to a laser spot at a high intensity, thereby causing thermal interference is preferred and has a good controllability. In this case, a portion applied with a beam at high intensity is melted. In the molten portion, a portion nearer to a portion applied with a weak beam and suffering from more thermal effect is heated to a higher temperature than other portions. Then, as described above, since a surface tension of a liquid is generally greater as a temperature is lower and smaller as a temperature is higher, the portion at the lower temperature is rounded by the surface tension, intakes a liquid from the higher temperature portion to form a protrusion, and a depression is formed at a finally solidified portion at high temperature in any of the methods described above.

The pulsed laser beam described above may be obtained by pulsing a continuously emitted laser with a modulator (EOM, AOM) and disposing a slit or the like to a portion of an optical path, using a combination of a Q-switch pulsed solid-state laser having an extremely short irradiation time and a semiconductor laser or the like, or splitting a portion of a laser beam and condensing a split beam at a low energy in the vicinity of an original beam condensing point. Further, the diameter of the condensed beam spot is preferably as small as possible in order to form a sharp projection.

The molten region is cooled to a lower temperature by thermal diffusion and solidified. Since the temperature of the molten portion that is over-heated to a high temperature lowers more moderately as compared with other portions, and a portion of which temperature lowered initially rises by an increased surface tension, it intakes a molten liquid from a portion heated to a higher temperature to form a protrusion, and a finally solidified portion forms a depression. Accordingly, a projection having a depression in adjacent with the protrusion is formed.

In the producing method according to the fifth aspect of the present invention, the spot diameter of the pulse laser in the direction of the major axis is not more than 10 $\mu$m, preferably not more than 5 $\mu$m, more preferably not more than 2.5 $\mu$m in order to prepare a unique projection. Further, the total power at the spot of the irradiated portion is not more than 5 W, preferably not more than 1 W, more preferably not more than 500 mW and the lower limit thereof usually is 50 mW preferably. Further, while depending on the number of rotation of the substrate, an irradiation time for preparing a desirable projection is not more than 2 $\mu$s, preferably not more than 1 $\mu$s, more preferably not more than 0.5 $\mu$s. Particularly, when a pulsed laser beam described above is irradiated to a sirface of an NiP or Cr layer plated on an Al substrate or a glass substrate, a projection of the unique shape as described above is formed. The top of the thus formed projection is not flat but has a moderate curvature.

Among the conditions described above, when the average energy density of the laser spot is not less than 500–700 mW/$\mu$m$^2$ and the spot diameter is not less than 3 $\mu$m, the projection is in a shape formed as a portion of a crater rim. That is, the projection is formed as a portion of a crater-shaped rim having a rim portion asymmetric with respect to the center and having a difference for the height of the rim. Since the portion where the height of the rim is low is not substantially in contact with the lower surface of the head upon CSS operation, a good CSS property can be obtained. The difference of the height in the rim portion between a portion forming a substantial projection and a portion having a lower height is not less than 2, preferably about 3 to 5 as a ratio of the height of the latter to the former, and the open end face of the rim is preferably inclined to the surface of the substrate.

When a laser beam having a Gaussian distribution for the energy density is used, or if the laser beam power is excessively large and the melting range is too large even when the energy density is asymmetric, one large circular molten range is formed, in which a finally solidified central portion forms a depression and a crater-like which is in point-to-point symmetry and at a uniform height is formed at the periphery, and the same shape of projection as prepared by the method disclosed in U.S. Pat. Nos. 5,062,021 and 5,108,781 is formed.

Accordingly, the present invention is greatly different from the U.S. patents described above in that the abrupt projection is formed to provide a unique projection shape because the energy density is made asymmetric with respect to the spot center, the laser beam is restricted to a narrow range and the molten portion is defined to an optimum range. A preferred molten range is not more than 5 $\mu$m(major axis). The area at the top end of the thus formed projection is extremely small, to form a preferred projection for CSS.

Further, the height of the projection can be controlled optionally by adjusting the spot area, the energy distribution and the power of the laser, and the density of projection can be controlled optionally by adjusting the conditions for controlling the number of projections per one circumference, the irradiation interval in the radial direction of the pulse laser and the height of projection.

The irradiation area of the laser beam can be changed usually by changing the numerical aperture of the objective lens, and the irradiation diameter of the beam can be controlled about from 12 to 0.7 $\mu$m by using an objective lens having a numerical aperture from 0.05 to 0.95.

According to the present invention as described above, since a plurality of laser beam sources small in size, inexpensive and having long life are used, or beams from a laser beam source is split into a plurality of beams, or the shape of the beam spot is made rectangular-like or elliptic-like, a projection having a plurality of protrusions is formed by pulse irradiation for once to enhance the production efficiency for texturing.

Further, since the magnetic recording medium according to the present invention has a surface shape controlled for the height and the top end shape of the projections, the existent region and the density of the projections, the area of contact between the lower surface of the magnetic head and the surface of the magnetic recording medium is reduced, to extremely lower the friction during CSS operation, and the magnetic head does not stick to the surface of the magnetic recording medium at all.

Further, the present invention provides a magnetic recording medium in which the height of projection in the CSS zone decreases on the side of the data recording zone toward this zone and the density of projection is increased in a place where the height of projection is lower. In such a magnetic recording medium, higher recording density can be attained easily since the flying height of the magnetic head in the data recording zone can be lowered to its extremely limit, and CSS operation can be conducted while seeking a magnetic head from lower to higher portions of the projections in the CSS zone with the bottom of the magnetic head being in contact with the projections while rotating the magnetic recording medium.

EXAMPLES

The present invention will be explained more in details by way of examples but the present invention is not restricted only to the following examples but may be modified variously within the scope of the invention is not exceeded.

Example 1

When two laser beams (wavelength: 532 nm) with power at a surface of 150 mW and a spot diameter of about 1.3 $\mu$m were irradiated for 100 ns simultaneously such that the distance between each of the beam centers was about 2 $\mu$m, to a glass substrate used for hard disk applied with Ni-P sputtering to 150 nm thickness and rotated at 900 rpm, formation of two projections at a height of 38 nm was observed. The density of projection was controlled to $10^4$ N/mm . FIG. 5(a) and FIG. 5(b) show the result of measuring the shape of the projection using a surface shape measuring device utilizing laser interference ("ZYGO" manufactured by ZYGO Co. in USA). FIG. 5(a) represents the shape of the projection in a three dimensional manner and FIG. 5(b) shows the shape of a vertical cross section of the projection, respectively.

Then, a Cr intermediate layer (100 nm), a Co—Cr—Ta alloy magnetic film (50 nm) and a carbon protective film (20 nm) were formed successively by a sputtering method on the glass substrate having projections formed thereon and then a fluoro-based liquid lubricant (DOL-2000, trade name, manufactured by Monte Edison Co.) was coated to 2 nm thickness by a dipping method to produce a magnetic recording medium.

As a result of measuring a static frictional coefficient before CSS test (initial stiction) and frictional force after 20,000 cycles of CSS for the magnetic recording medium described above, the friction coefficient of the initial stiction was 0.22 and the friction force after CSS test was 6 gf, to obtain satisfactory CSS property. The stable head flying height in the CSS zone was 1.6 $\mu$ inch. The CSS test was conducted by using a thin film head at 6 gf of load gram (slider material: $Al_2O_3TiC$) and under condition of a head flying height of 1.6 $\mu$ inch. Further, the stable flying height of the head was evaluated by using a glide tester for the flying stability of the head upon seeking a data recording zone and a CSS zone.

Example 2

When a laser beam (532 nm) controlled to a surface power at 240 mW and a ratio for major axis to minor axis of about 2.3 (3 $\mu$m:1.3 $\mu$m) was irradiated under the condition of 270 ns to an aluminum substrate used for a hard disk applied with Ni—P plating to 15 $\mu$m thickness and rotated at 900 Rpm, formation of two projections at 18 nm height was observed. The density of projection was controlled to $10^4$ $N/mm^2$. In this example, the laser beams were irradiated under the conditions of a pulse width ($\delta$):0.27 $\mu$s, a relative moving speed (V) between the laser spot and the irradiation surface of the laser beam: 1885 mm/sec and maximum diameter (D) in the direction parallel with the relative moving direction of the laser spot: 3 $\mu$m. The scanning parameter P defined as P=$\delta$V/D is 0.17. The surface shape and cross sectional view of the projection measured by the same manner as example 1 are shown in FIG. 6(a) and FIG. 6(b).

Then, a Cr intermediate layer (100 nm), a Co—Cr—Ta alloy magnetic film (50 nm) and a carbon protective film (20 nm) were formed successively by a sputtering method on the above Al substrate and then a fluoro-based liquid lubricant (DOL-2000, trade name, manufactured by Monte Edison Co.) was coated to 2 nm thickness by a dipping method to produce a magnetic recording medium.

As a result of measuring a static friction coefficient before CSS test (initial stiction) and frictional force after 20,000 cycles of CSS for the magnetic recording medium described above, the friction coefficient of the initial stiction was 0.32 and the friction force after CSS test was 9 gf, to obtain satisfactory CSS property. The stable head flying height in the CSS zone was 1.2 $\mu$ inch. The CSS test was conducted by using a thin film head at 6 gf of load gram (slider material: $Al_2O_3TiC$) and under the condition of a head flying height of 1.4 $\mu$ inch.

Example 3

When two laser beams (wave length: 1,064 nm) with a power at the surface of 270 mW, 100 mW respectively and a spot diameter of about 2.5 $\mu$m were overlapped to each other such that the distance between each of the beam centers was about 1 $\mu$m and irradiated at a pulse width of 0.5 $\mu$s and such that the distribution of the energy density was asymmetric with respect to the center to an Al substrate for a hard disk applied with Ni—P plating to a 15 $\mu$m thickness and rotated at 3600 Rpm, a unique projection having a height of 36 nm, a cross sectional area 1 nm below the top of 0.06 $\mu$m and having a depression in adjacent with the projection was formed. The surface shape and cross sectional view of the projection measured by the same manner as example 1 are shown in FIG. 6(a) and FIG. 6(b).

In Example 3, the density of projection was controlled to 5,000 $N/mm^2$. Then, a Cr intermediate layer (100 nm), a Co—Cr—Ta alloy magnetic film (50 nm) and a carbon protective film (20 nm) were formed successively by a sputtering method on the Al substrate having projections formed thereon and then a fluoro-based liquid lubricant (DOL-2000, trade name, manufactured by Monte Edison Co.) was coated to 2 nm thickness by a dipping method to produce a magnetic recording medium.

As a result of measuring a static friction coefficient before CSS test (initial stiction) and frictional force after 20,000 cycles of CSS for the magnetic recording medium described above, the friction coefficient of the initial stiction was 0.32 and the friction force after CSS test was 7 gf, to obtain a satisfactory CSS property. The stable head flying height in the CSS zone was 1.7 $\mu$ inch. The CSS test was conducted by using a thin film head at 6 gf of load gram (slider material: $Al_2O_3TiC$) and under the condition of a head flying height of 2.0 $\mu$ inch.

Example 4

Figure 8A:
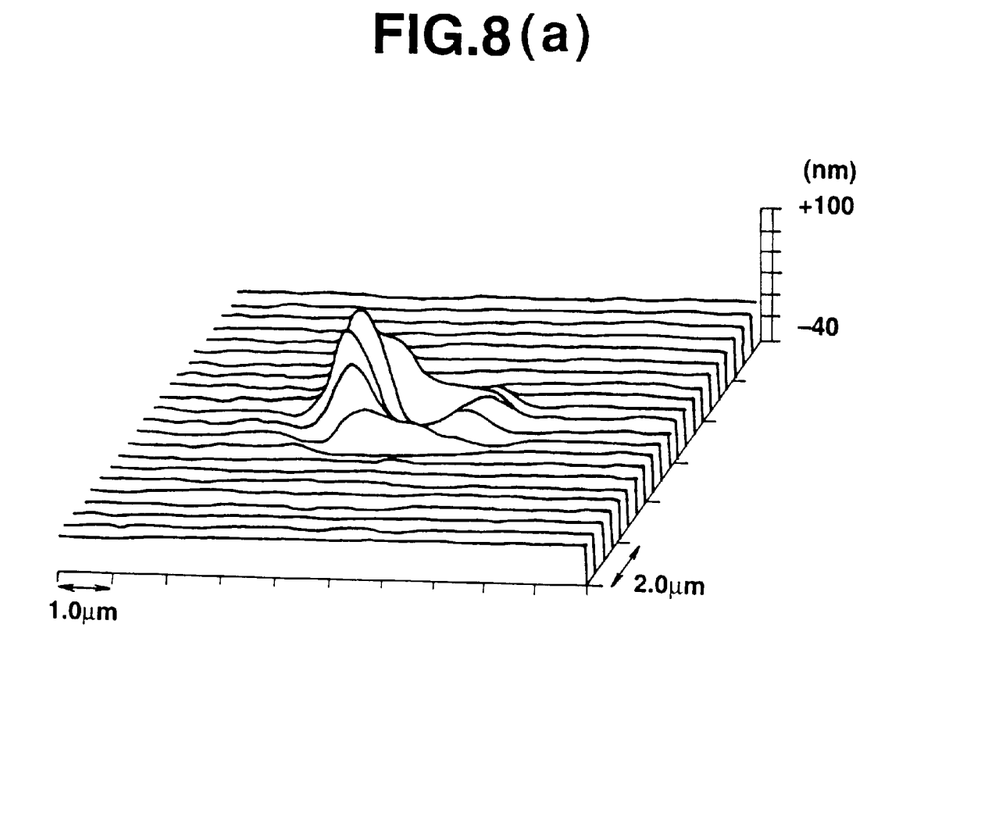
FIG. 8(a) is a perspective view illustrating the shape of a projection obtained in Example 4.
Figure 8B:
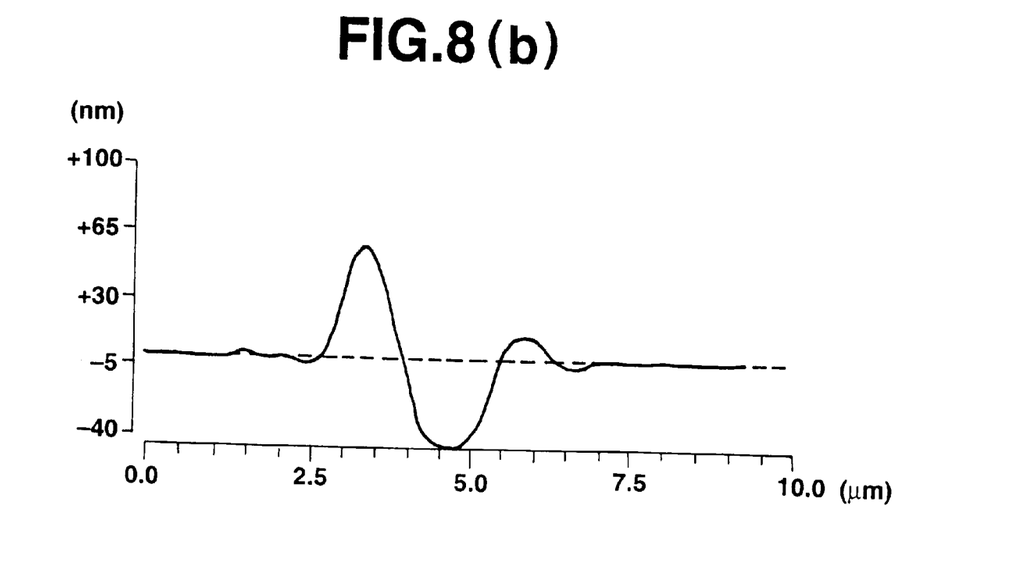
FIG. 8(b) is a vertical cross sectional view of a plane passing through the center of the projection and parallel with a scanning direction of energy beams (laser beams) illustrating the shape of a projection formed in Example 4.

When two laser beams (wave length: 1,064 nm) with a power at the surface of 700 mW, 200 mW respectively and a spot diameter of about 2.5 $\mu$m were overlapped to each other such that the distance between each of the beam centers was about 1.5 $\mu$m and irradiated at a pulse width of 0.5 $\mu$s and such that the distribution of the energy density was asymmetric with respect to the center, to an Al substrate for a hard disk applied with Ni—P plating to 15 $\mu$m thickness and rotating at 900 Rpm, a unique crater-like projection having a height at the highest portion of the rim of 40 nm, a cross section 1 nm below the top of 0.20 $\mu m^2$ and having a depression in adjacent with the projection. The surface shape and cross sectional view of the projection measured by the same manner as example 1 are shown in FIG. 8(a) and FIG. 8(b).

In Example 4, the density of projection was controlled to 5,000 $N/mm^2$. Then, a Cr intermediate layer (100 nm), a Co—Cr—Ta alloy magnetic film (50 nm) and a carbon protective film (20 nm) were formed successively by a sputtering method on the Al substrate having projections formed thereon and then a fluoro-based liquid lubricant (DOL-2000, trade name, manufactured by Monte Edison Co.) was coated to 2 nm thickness by a dipping method to produce a magnetic recording medium.

As a result of measuring a static friction coefficient before CSS test (initial stiction) and frictional force after 20,000 cycles of CSS for the magnetic recording medium described above, the friction coefficient of the initial stiction was 0.45 and the friction force after CSS test was 12 gf, to obtain satisfactory CSS property. The stable head flying height in the CSS zone was 1.7 $\mu$ inch. The CSS test was conducted by using a thin film head at 6 gf of load gram (slider material: $Al_2O_3TiC$) and under the condition of a head flying height of 2.0 $\mu$ inch.

What is the claimed is:

1. A magnetic recording medium comprising at least a magnetic layer, directly or via an under layer and an intermediate layer thereon, on a non-magnetic substrate and, optionally a protective layer disposed on the magnetic layer, wherein projections each of a shape having a plurality of protrusions per one projection are formed in a number of from 10 to $10^6$ projections per 1 mm² by irradiation of an energy beam to a surface of at least one of the substrate, the under layer, the intermediate layer, the magnetic layer and the protective layer, said projections and protrusion being of the same material as said surface.

2. A magnetic recording medium according to claim 1, wherein the height of protrusion is from 1 to 60 nm.

3. A magnetic recording medium according to claim 1, wherein an area of a figure surrounded by a contour line at a height 1 nm below the top of the protrusion is not more than 1 μm² in average.

4. A magnetic recording medium according to claim 1, wherein an area of a figure surrounded by a contour line at a half-height of the protrusion is not more than 5 μm² in average.

5. A magnetic recording medium according to claim 1, wherein the ratio R for a major axis to a minor axis of a melted or softened portion at the bottom of the projection is not less than 2.

6. A magnetic recording medium according to claim 5, wherein the major axis is not more than 10 μm and the minor axis is not more than 5 μm.

7. A magnetic recording medium according to claim 1, wherein the magnetic recording medium comprises a CSS zone and wherein the projections are formed substantially only in the CSS zone.

8. A magnetic recording medium according to claim 1, wherein the magnetic recording medium comprises a CSS zone and a data recording zone and wherein the height of projection in the CSS zone is decreased toward the data recording zone, and the density of projection is increased in a portion in which the height of the projection is lower.

9. A magnetic recording medium according to claim 1, wherein the projections are formed on the under layer.

10. A method of producing a magnetic recording medium according to claim 9 containing projections formed by irradiating a pulsed laser beam to the surface of at least one of a substrate, an under layer, an intermediate layer, a magnetic layer and a protective layer, thereby melting or softening the surface, which comprises irradiating a plurality of laser beams while moving a relative position of a spot on the irradiation surface of the laser beam and controlling so that the distance between each of the beam centers is not more than 20 μm.

11. A method of producing a magnetic recording medium according to claim 10 containing projections formed by irradiating a pulsed laser beam to the surface of at least one of a substrate, an under layer, an intermediate layer, a magnetic layer and a protective layer, thereby melting or softening the surface, which comprises irradiating a laser beam while moving a relative position of a spot on the irradiation surface of the laser beam and controlling so that a ratio (R) for a major axis to a minor axis of an elliptic beam spot is not less than 2.

12. A method of producing a magnetic recording medium according to claim 10, wherein a laser beam is irradiated under the condition that the scanning parameter P which is defined as P=δV/D is not more than 0.25, wherein δ is a pulse width of the laser beam, V is a relative moving speed between a laser spot and the irradiation surface of the laser beam and D is the maximum diameter of the laser beam spot in the direction parallel to a relative moving direction of the laser spot.

13. A method of producing a magnetic recording medium according to claim 10, which comprises irradiating a laser beam with an asymmetric distribution of the energy density with respect to the spot center (not in rotational symmetry) to the surface of at least one of a substrate, an under layer, an intermediate layer, a magnetic layer and a protective layer, thereby forming projections each having a protrusion and a depression adjacent thereto, said protrusion having an area of a figure surrounded by a contour line at a height 1 nm below the top of the raised center line (Rp) of not more than 1 μm² in average.

14. A method of producing a magnetic recording medium according to claim 13, wherein the projection is formed as a portion of a rim-shaped portion and has a difference in the height and asymmetric with respect to the center.

15. A method of producing a magnetic recording medium according to claim 13, wherein the projection is formed by using a laser beam with a distribution of the energy density asymmetric with respect to the spot center by overlapping a plurality of laser beams.

16. A method of producing a magnetic recording medium according to claim 10 comprising irradiating a plurality of laser beams of different intensity at such an interval that a thermal effect is exerted to the surface of at least one of a substrate, an under layer, an intermediate layer, a magnetic layer and a protective layer thereby forming projections each having a protrusion and a depression adjacent thereto, said protrusion having an area of a figure surrounded by a contour line at a height 1 nm below the top of not more than 1 μm² in average.

17. A magnetic recording medium comprising at least a magnetic layer, optionally, by means of an under layer and an intermediate layer thereon, on a non-magnetic substrate and, optionally a protective layer disposed on the magnetic layer, wherein a plurality of projections each having a protrusion and a depression adjacent thereto, the protrusion having a maximum peak height Rp of from 2 to 60 nm and the area of a figure surrounded by a contour line at a height 1 nm below the top of not more than 1 μm² in average, are formed to the surface of at least one of the substrate, the under layer, the intermediate layer, the magnetic layer and the protective layer, and the projection is formed as a portion of a crater-shaped rim having a difference in the height of the rim portion between a portion forming a substantial projection and a portion having a lower height is not less than 2 as a ratio of the height of the latter to the former.

18. A magnetic recording medium according to claim 17, wherein the projection is formed as a portion of a crater-shaped rim inclined to the surface of the substrate.

19. A magnetic recording medium according to claim 17, wherein the magnetic recording medium comprises a CSS zone and wherein the projections are formed substantially only in the CSS zone.

20. A magnetic recording medium according to claim 17, wherein the magnetic recording medium comprises a CSS zone and a data recording zone and wherein the height of projection in the CSS zone is decreased toward the data recording zone, and the density of projection is increased in a portion in which the height of the projection is lower.

21. A magnetic recording medium according to claim 17, wherein the projections are formed on the under layer.

22. A magnetic recording medium according to claim 17, wherein the projections are formed by the number of from 10 to $10^6$ per 1 mm².

23. A magnetic recording medium according to claim 17, the projection is formed as a portion of a crater-shaped rim having a difference in the height of the rim portion between a portion forming a substantial projection and a portion having a lower height is about 3 to 5 as a ratio of the height of the latter to the former.

* * * * *